Dec. 22, 1964   R. J. BENNETT   3,162,548
RESERVE ENERGIZER
Filed Oct. 23, 1961

INVENTOR.
ROSWELL J. BENNETT
BY *W. O. Quesenberry*
*O. E. Hodges*
ATTYS.

United States Patent Office 3,162,548
Patented Dec. 22, 1964

3,162,548
RESERVE ENERGIZER
Roswell J. Bennett, Lakewood, Ohio, assignor, by mesne assignments, to the United States of America as represented by the Secretary of the Navy
Filed Oct. 23, 1961, Ser. No. 147,107
1 Claim. (Cl. 136—90)

This invention relates to an improvement in small high voltage batteries, particularly those of the deferred action type that contain a sealed electrolyte which is not applied to the cell electrodes until immediately before use.

One of the shortcomings heretofore encountered in the use of deferred action type batteries has been the starving of some cells of the electroylte and over flooding of other cells with the electrolyte. This condition has existed because the center of gravity of the shell or projectile has not been the axial center of the shell or projectile. This causes the electrolyte in the battery to be unevenly distributed during the flight of the projectile. Heretofore it has been the general practice in the field of reserve energizers to construct the energizer cell of a plurality of annular steel plates compatibly coated and separated by paper separators having a pair of fill channels located diametrically opposite to each other. The annular plates and the separators are alternatively stacked tightly together and encapsulated with an insulating material over the outer and inner surfaces thereof except for the small area which forms the fill channels for the cells. Within the reserve energizers is generally an ampule which is supported on a platform above an irregular shaped breaker unit. The ampule contains an electrolyte sealed therein. The ampule may be made of a frangible material that may be easily broken when it comes into contact with the irregular shaped breaker. When the projectile is fired containing the reserve energizer, the set-back force experienced by the frangible ampule which is fixedly held in place, is sufficient to cause the ampule to become dislodged from its normal position and to strike the irregular shaped breaker with sufficient force to break it and discharge the electrolyte.

The electrolyte is released within the ampule cavity and due to the centrifugal forces acting on the electrolyte by virtue of the spin of the projectile, the electrolyte is forced through the fill channels into the individual cells to activate the battery.

Flight characteristics introduced by ballistic operation of the projectile impose, in some cases, eccentricities of spin on the battery which interfere with the proper distribution of the electrolyte immediately following set-back. This has resulted in the occurrence of noise voltage early in the life of the battery. If deferred action batteries are used in electrical fuzes for artillery projectiles, an excessive noise voltage may cause premature detonation of the fuze. If the eccentric spin is great enough all the electrolyte will be forced into one fill channel causing it to short out and the plates on the opposite side of the battery will be starved of any electrolyte. Prior devices have utilized a separator having a concentric cell channel to prevent the starving of part of the battery of electrolyte. This design has proved satisfactory when the projectile is spinning about a center of gravity which is identical to the center of gravity of the battery, however, this design has not proven to be entirely satisfactory when the projectile is spinning about a center of gravity that is not in line with the longitudinal axis of the battery. Such an off center spin results in a non-uniform distribution of the electrolyte within the cell channels thereby reducing the area of the cell plates over which the electrolyte is distributed.

Such a reduction in contact area of the electrolyte with the cell plates results in a decrease in the output power of the cell.

Applicant's split stack rotating reserve energizer not only provides an additional voltage output but also obviates the disadvantages known in the prior art. The present invention contemplates a split stack reserve energizer with dual fill channels in an eccentric design to facilitate the complete filling by the electrolyte in the battery during eccentric operation of the projectile.

It is an object of this invention to provide means for filling all the cells of the rotating reserve energizer with electrolyte to a desired level in a minimum of time.

Another object is to provide a split stack energizer with dual channels for completely filling the energizer with electrolyte when the projectile develops an off center spin during flight.

A further object is to provide means for filling a portion of the cells to a uniform level by the direct radial flow of electrolyte without the use of leveling holes in the plates to attain equilibrium in the level of the electrolyte.

A still further object is to provide a split stack reserve energizer of the force filled type which produces a uniform voltage output even with an eccentric spin.

A still further object is to provide a dual fill channel split stack rotating reserve energizer of the forced fill type for use in a spinning projectile which is not rendered ineffective for its end use upon the occurrence of an eccentric spin developed by the projectile.

Further objects of the entire scope of the invention will become more clearly apparent in the following detailed description and in the appended claim. The accompanying drawings display the general construction and operational principles of the invention; it is to be understood, however, that the drawings are furnished only by way of illustration and not in limitation thereof and wherein:

Figure 1:
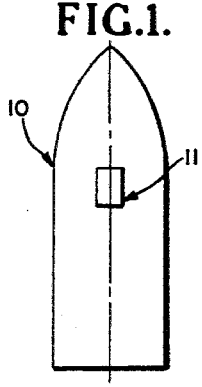
FIG. 1 illustrates diagrammatically the projectile containing the split stack reserve energizer embodying the present invention.
Figure 2:
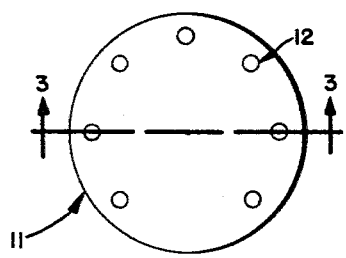
FIG. 2 is an enlarged plan view of the split stack reserve energizer of the present invention.

Referring now to FIG. 1 there is illustrated diagrammatically a projectile generally indicated by the numeral 10 within which is contained a reserve energizer 11 embodying the principles of the present invention. The longitudinal axis of battery 11 coincide with the longitudinal axis of the projectile 10. Applicant's split stack reserve energizer is approximately one and one-half inches in diameter and one and one-quarter inches in overall length. The reserve energizer has a plurality of electrical connections 12 as shown in FIG. 2.

Figure 3:
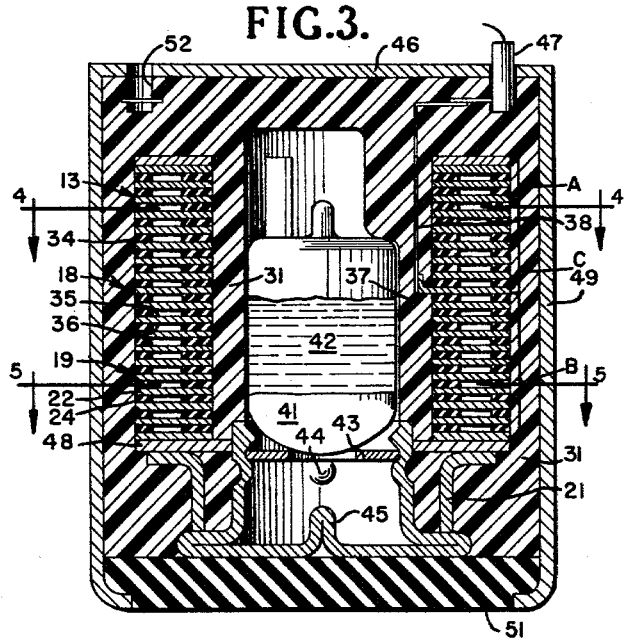
FIG. 3 is a section greatly enlarged and taken along line 3—3 of FIG. 2.
Figure 5:
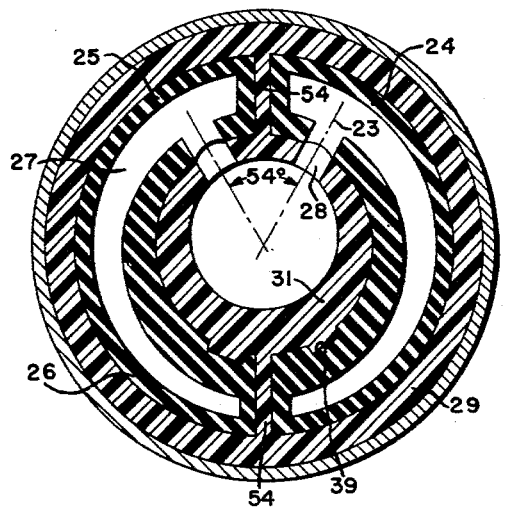
FIG. 5 is a section taken along line 5—5 of FIG. 3 and illustrates the cavity in the high voltage B section.

Referring now to FIG. 3 the general construction of applicant's device will now be described. The reserve energizer has three basic voltage generating sections which will be described from top to bottom with reference to FIG. 3. The top section of the reserve energizer is the A section 13 with an output of approximately 1.5 volts which is used to heat the filament of an electron tube. The battery plates 14 in this section are ring shaped and are connected in parallel with leveling holes 15 in each of the plates for adjusting the level of the electrolyte therein. Each plate is separated from the adjacent plate by paper separators 16 having two filling holes 17 that are aligned with the fill channels shown in FIG. 4. The grid bias C section 18 of the battery is located in the medial portion thereof and is composed of a section of the split stack as shown in FIG. 5. The C section is a four cell nominally 7½ volt unit for use as a bias voltage. The B section 19 located in the bottom portion of the energizer consists of approximately 96 cells nominal 170 volts as shown in FIG. 5 consisting of half plate sections, the B section being tapped somewhere near the middle portion to provide a 100 volt source. It should be understood that the various sections of the annular stack of cells illustrated as the A, B and C sections merely represent the order of the sections within the annular stack and are not intended to define a specific number of cells within each of the sections. Any one of the A, B or C sections may be connected to the output terminals shown in FIG. 2 by any convenient means and such connection would appear obvious to one skilled in the art. For further detailed illustration of how the various sections of the annular stack of cells may be connected to output terminals, reference may be made to Patent No. 2,981,779, assigned to the assignee of the present invention.

As shown in FIG. 3 the three sections are mounted on a steel stack support 21, the B section having two semi-circular discs 22 mounted to face each other with two small cut-out portions 23 located approximately on a 27° arc from the one end, and will form the fill channel. Between each plate 22 is a paper separator 24, the outside portion 25 of the paper separators having a center located at the axial center and the inside portion 26 of the separator being partially elliptical in shape to provide a large cavity 27 near the fill channels. This additional fill cavity 27 between the plates is disposed near the front of the plates and near the fill channels to accommodate an excess electrolyte that will be located between the battery plates if the projectile should develop a wobble later in the flight this additional electrolyte will be maintained between the cell plates. After the energizer plates have been assembled, the entire stack is molded with an elastomeric vinylite jacket 29. The alternate plates and separators of the energizer are stacked at right angles to the axis of the unit in such fashion that the scallops or fill channels, shown in FIGS. 4 and 5, form two channels 28 located approximately 54° apart. An open segment in the inner portion of the paper separators registers with the plate scallops to form an entry port, from top to bottom of the stack thereby permitting flow of the electrolyte into the active cell area. The stack is encased in a special non-contaminating elastomeric vinylite molding compound 29. The vinylite molding compound 31 used to insulate the inside portion of the stack, has an axial center that is .020 inch off of the axial center of the battery toward the fill channel.

The plates 22 used in the stack in this energizer are composed of steel with a nickel flash (not shown) of approximately .0002 of an inch and a coating of lead 35 on one side and lead dioxide 36 on the other side of approximately .0004 of an inch in thickness. The 100 volt B tap 37 is carried out of the stack by a wire 38 passing up the channel formed by the back plate scallops 39.

Because of the short length of the battery stack it was necessary to use a special ampule 41 to contain the electrolyte 42. The ampule is made from a Pyrex glass. The ampule contains an electrolyte of fluoboric acid which has a very low electrical resistance. The ampule is held in place by a spring ring 43 mounted on detents 44 above the irregular shaped breaker 45.

Upon the rapid acceleration received during firing, the spring ring slips past the detent members allowing the ampule to strike a breaker member allowing the electrolyte to splash in the cavity area. It has been found that a considerable amount of electrolyte is distributed by the splashing of the electrolyte during breakage. Any remaining electrolyte is forced into the fill channels by the eccentric rotation of the battery during flight. The electrolyte entering the cells due to rotation starts from the bottom and works its way up to the B section to the C section and then to the A section. The electrical connections are passed up through small scallops in the plates and separators as shown in FIG. 5 and are embedded in the vinylite molding.

The electrical connections terminate in a monitor base plate 46 which rests squarely upon the top of the reserve energizer and the connecting monitor pins 47 are received entirely within the battery as shown in FIG. 3.

The two split sections of the reserve energizer are joined together mechanically and electrically by a scalloped steel washer 48 at the bottom of the stack. The A section, B section, and C section are separated from each other by vinyl barriers 54 which is the same size as the battery plates which they separate. The entire energizer is encased in a metallic container 49 which is rolled or crimped around the non-metallic base plate 51. Apertures 52 located in the top of the metallic casing are of sufficient size to allow electrical connections to be made into the battery without causing a short circuit.

Figure 4:
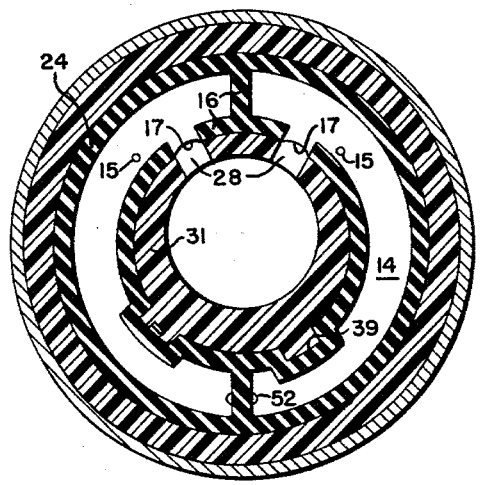
FIG. 4 is a section taken along line 4—4 of FIG. 3 and illustrates the design of the filament heater A section of the energizer and the location of the dual fill channels.

In order to provide a one piece A section in a split stack unit as disclosed herein it was necessary to provide a double open aperture 17 in the A section separator 16. This was done by the use of a single paper separator having double entry ports as illustrated in FIG. 4. This arrangement divided the A section into two compartments. To achieve a uniform distribution of electrolyte throughout the A section, and to retain the reserve function of the A section it was necessary to provide a leveling hole system. This was achieved by providing two leveling holes 15 on each side of the channel entry ports at the outer periphery of the inner separator and effectively placing them out of the areas normally wetted by the electrolyte.

To allow freedom of passage, and to achieve uniform leveling between two halves of the A section, an oval slot 52 in one or more battery plates provides an access beneath the separator located opposite the fill channel. These slots act as an electrolyte transfer port. This leveling arrangement 52 allows even distribution of the electrolyte throughout the A section, even though the electrolyte may enter by way of only one of the two fill channels.

By use of the novel split stack reserve energizer, applicant has been able to achieve a substantially high voltage from a very small energizer. By the use of an eccentric cavity formed in accordance with this invention applicant has been able to achieve a uniform filling of each split stack even though the projectile may develop a wobble during flight. Even if the projectile wobbles after the electrolyte has entered the cavity between the plates, by use of applicant's novel design this electrolyte will not reenter the fill channels and short out the battery.

Obviously many modifications and variations of the present invention are possible in the light of the above teachings. It is therefore to be understood that within the scope of the appended claim, the invention may be practiced otherwise than as specifically described.

What is claimed as new and desired to be secured by Letters Patent of the United States is:

A reserve energizer for use as a power source in a spin-type projectile; said energizer comprising a plurality of annular parallel connected cells forming the filament heater section of the energizer, a plurality of semi-annular series connected cells forming the grid bias section and the high voltage section of said energizer, said annular parallel connected cells and semi-annular series connected cells located adjacent each other and being formed by an annular stack of spaced energizer plates, a jacket of impervious insulating material surrounding the outer circumference of said stack, a cylindrical compartment of impervious insulating material eccentrically disposed within said annular stack, said compartment having a pair of fill channels therein located wholly within a semi-cylindrical wall of said compartment and arcuately spaced less than 180° apart said fill channels wholly interrupting said compartment adjacent said annular stack, paper separator means disposed between adjacent plates comprising said semi-annular series connected cells and having a pair of arcuate openings therethrough eccentric to said jacket, said separator means further having a pair of entry ports each communicating respectively with a different one of said arcuate openings at sections of maximum width thereof, said entry ports being positioned at closely adjacent points on the inner periphery of said separator means and each aligned with and abutting, respectively, a different one of said fill channels, paper separator means additionally disposed between adjacent plates comprising said parallel connected cells and having a pair of arcuate openings therethrough concentric with said jacket, a frangible ampule containing an electrolyte located in said eccentrically disposed compartment, means for breaking said ampule upon being properly accelerated, whereby said electrolyte will flow into said closely spaced adjacent entry ports in substantially equal quantities during off center spins of said energizer.

References Cited by the Examiner
UNITED STATES PATENTS

| | | | |
|---|---|---|---|
| 2,927,145 | 3/60 | Burrell | 136—90 |
| 2,981,778 | 4/61 | Freund | 136—90 |
| 2,981,779 | 4/61 | Freunde | 136—90 |
| 2,985,702 | 5/61 | Darland | 136—90 |

JOHN H. MACK, *Primary Examiner.*

JOSEPH REBOLD, JOHN R. SPECK, *Examiners.*